(12) United States Patent
Sharma et al.

(10) Patent No.: US 11,122,114 B2
(45) Date of Patent: *Sep. 14, 2021

(54) SELECTIVE LOAD BALANCING OF NETWORK TRAFFIC

(71) Applicant: Cisco Technology, Inc., San Jose, CA (US)

(72) Inventors: Samar Sharma, San Jose, CA (US); Mouli Vytla, San Jose, CA (US); Rajendra Kumar Thirumurthi, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/537,966

(22) Filed: Aug. 12, 2019

(65) Prior Publication Data

US 2019/0364102 A1 Nov. 28, 2019

Related U.S. Application Data

(63) Continuation of application No. 14/693,925, filed on Apr. 23, 2015, now Pat. No. 10,382,534.

(Continued)

(51) Int. Cl.
*H04L 29/08* (2006.01)
*H04L 12/00* (2006.01)
*H04L 29/12* (2006.01)

(52) U.S. Cl.
CPC .......... *H04L 67/1002* (2013.01); *H04L 12/00* (2013.01); *H04L 61/00* (2013.01); *H04L 67/1023* (2013.01); *H04L 67/1025* (2013.01)

(58) Field of Classification Search
CPC ..... H04L 12/00; H04L 12/4625; H04L 61/00; H04L 67/1002; H04L 67/1023; H04L 67/1025
See application file for complete search history.

(56) References Cited

U.S. PATENT DOCUMENTS 6,108,782 A 8/2000 Fletcher et al.
6,178,453 B1 1/2001 Mattaway et al.
(Continued)

FOREIGN PATENT DOCUMENTS

CN 101719930 6/2010
CN 101394360 7/2011
(Continued)

OTHER PUBLICATIONS

Al-Harbi, S.H., et al., "Adapting k-means for supervised clustering," Jun. 2006, Applied Intelligence, vol. 24, Issue 3, pp. 219-226.
(Continued)

*Primary Examiner* — June Y Sison
(74) *Attorney, Agent, or Firm* — Polsinelli

(57) ABSTRACT

In one embodiment, load balancing criteria and an indication of a plurality of network nodes is received. A plurality of forwarding entries are created based on the load balancing criteria and the indication of the plurality of nodes. A content addressable memory of a network element is programmed with the plurality of forwarding entries. The network element selectively load balances network traffic by applying the plurality of forwarding entries to the network traffic, wherein network traffic meeting the load balancing criteria is load balanced among the plurality of network nodes.

20 Claims, 4 Drawing Sheets

| 300 | DEVICE GROUP | DESTINATION IP RANGE | L4 PROTOCOL | DESTINATION L4 PORT |
|---|---|---|---|---|
| | 1.1.1.1.1; 1.1.1.2; 1.1.1.3; 1.1.1.4 | 200.200.0.0/255.255.255.255 | TCP | 80 |

| 350 | OPERATION | PORT IDENTIFIER | SOURCE IP RANGE | DESTINATION IP RANGE | L4 PROTOCOL | DESTINATION L4 PORT |
|---|---|---|---|---|---|---|
| 352a | REDIRECT | (0x60) | 0.0.0.0/0.0.0.192 | 200.200.0.0/255.255.255.255 | TCP | 80 |
| 352b | REDIRECT | (0x61) | 0.0.0.64/0.0.0.192 | 200.200.0.0/255.255.255.255 | TCP | 80 |
| 352c | REDIRECT | (0x5f) | 0.0.0.128/0.0.0.192 | 200.200.0.0/255.255.255.255 | TCP | 80 |
| 352d | REDIRECT | (0x62) | 0.0.0.192/0.0.0.192 | 200.200.0.0/255.255.255.255 | TCP | 80 |
| 354 | PERMIT | | 0.0.0.0/0 | 0.0.0.0/0 | | |

Related U.S. Application Data

(60) Provisional application No. 62/143,081, filed on Apr. 4, 2015.

(56) References Cited

U.S. PATENT DOCUMENTS

| | | |
|---|---|---|
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,885,670 B1 | 4/2005 | Regula |
| 6,996,615 B1 | 2/2006 | McGuire |
| 7,028,098 B2 | 4/2006 | Mate et al. |
| 7,054,930 B1 | 5/2006 | Cheriton |
| 7,062,571 B1 | 6/2006 | Dale et al. |
| 7,076,397 B2 | 7/2006 | Ding et al. |
| 7,277,948 B2 | 10/2007 | Igarashi et al. |
| 7,313,667 B1 | 12/2007 | Pullela et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,684,322 B2 | 3/2010 | Sand et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,028,071 B1 | 9/2011 | Mahalingam et al. |
| 8,041,714 B2 | 10/2011 | Aymeloglu et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,284,776 B2 | 10/2012 | Petersen |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,252 B2 | 7/2013 | Lais et al. |
| 8,495,356 B2 | 7/2013 | Ashok et al. |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,663 B2 | 10/2013 | Baucke et al. |
| 8,590,050 B2 | 11/2013 | Nagpal et al. |
| 8,611,356 B2 | 12/2013 | Yu et al. |
| 8,630,291 B2 | 1/2014 | Shaffer et al. |
| 8,639,787 B2 | 1/2014 | Lagergren et al. |
| 8,660,129 B1 | 2/2014 | Brendel et al. |
| 8,719,804 B2 | 5/2014 | Jain |
| 8,775,576 B2 | 7/2014 | Hebert et al. |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,909,780 B1 | 12/2014 | Dickinson et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,104,334 B2 | 8/2015 | Madhusudana et al. |
| 9,111,013 B2 | 8/2015 | Cheriton |
| 9,164,795 B1 | 10/2015 | Vincent |
| 9,167,050 B2 | 10/2015 | Durazzo et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,628,471 B1 | 4/2017 | Sundaram et al. |
| 9,632,858 B2 | 4/2017 | Sasturkar et al. |
| 9,658,876 B2 | 5/2017 | Chang et al. |
| 9,692,802 B2 | 6/2017 | Bicket et al. |
| 9,727,359 B2 | 8/2017 | Tsirkin |
| 9,736,063 B2 | 8/2017 | Wan et al. |
| 9,755,858 B2 | 9/2017 | Bagepalli et al. |
| 9,792,245 B2 | 10/2017 | Raghavan et al. |
| 9,804,988 B1 | 10/2017 | Ayoub et al. |
| 9,825,902 B1 | 11/2017 | Sharma et al. |
| 9,954,783 B1 | 4/2018 | Thirumurthi et al. |
| 10,382,534 B1 * | 8/2019 | Sharma ................. H04L 12/00 |
| 2002/0004900 A1 | 1/2002 | Patel |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0095237 A1 | 5/2004 | Chen et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2005/0281257 A1 * | 12/2005 | Yazaki ................... H04L 45/00 |
| | | 370/389 |
| 2006/0039374 A1 * | 2/2006 | Belz ..................... H04L 47/10 |
| | | 370/389 |
| 2006/0059558 A1 | 3/2006 | Selep et al. |
| 2006/0087962 A1 | 4/2006 | Golia et al. |
| 2006/0104286 A1 | 5/2006 | Cheriton |
| 2006/0120575 A1 | 6/2006 | Ahn et al. |
| 2006/0126665 A1 | 6/2006 | Ward et al. |
| 2006/0155875 A1 | 7/2006 | Cheriton |
| 2006/0294207 A1 | 12/2006 | Barsness et al. |
| 2007/0011330 A1 | 1/2007 | Dinker et al. |
| 2007/0242830 A1 | 10/2007 | Conrado et al. |
| 2008/0005293 A1 | 1/2008 | Bhargava et al. |
| 2008/0084880 A1 | 4/2008 | Dharwadkar |
| 2008/0165778 A1 | 7/2008 | Ertemalp |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0010277 A1 | 1/2009 | Halbraich et al. |
| 2009/0019367 A1 | 1/2009 | Cavagnari et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0131765 A1 | 5/2010 | Bromley et al. |
| 2010/0191783 A1 | 7/2010 | Mason et al. |
| 2010/0192157 A1 | 7/2010 | Jackson et al. |

(56) References Cited

U.S. PATENT DOCUMENTS

| | | |
|---|---|---|
| 2010/0205601 A1 | 8/2010 | Abbas et al. |
| 2010/0211782 A1 | 8/2010 | Auradkar et al. |
| 2010/0217886 A1 | 8/2010 | Seren et al. |
| 2010/0318609 A1 | 12/2010 | Lahiri et al. |
| 2010/0325199 A1 | 12/2010 | Park et al. |
| 2010/0325257 A1 | 12/2010 | Goel et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145390 A1 | 6/2011 | Kakadia et al. |
| 2011/0145413 A1 | 6/2011 | Dawson et al. |
| 2011/0173303 A1 | 7/2011 | Rider |
| 2011/0185063 A1 | 7/2011 | Head et al. |
| 2011/0199902 A1 | 8/2011 | Leavy et al. |
| 2011/0213687 A1 | 9/2011 | Ferris et al. |
| 2011/0213966 A1 | 9/2011 | Fu et al. |
| 2011/0219434 A1 | 9/2011 | Betz et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0023418 A1 | 1/2012 | Frields et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0117571 A1 | 5/2012 | Davis et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0166649 A1 | 6/2012 | Watanabe et al. |
| 2012/0167094 A1 | 6/2012 | Suit |
| 2012/0173541 A1 | 7/2012 | Venkatarannani |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185632 A1 | 7/2012 | Lais et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0203908 A1 | 8/2012 | Beaty et al. |
| 2012/0204169 A1 | 8/2012 | Breiter et al. |
| 2012/0204187 A1 | 8/2012 | Breiter et al. |
| 2012/0214506 A1 | 8/2012 | Skaaksrud et al. |
| 2012/0222106 A1 | 8/2012 | Kuehl |
| 2012/0240113 A1 | 9/2012 | Hur |
| 2012/0265976 A1 | 10/2012 | Spiers et al. |
| 2012/0281706 A1 | 11/2012 | Agarwal et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0069950 A1 | 3/2013 | Adam et al. |
| 2013/0080509 A1 | 3/2013 | Wang |
| 2013/0091557 A1 | 4/2013 | Gurrapu, Sr. |
| 2013/0097601 A1 | 4/2013 | Podvratnik et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0179941 A1 | 7/2013 | McGloin et al. |
| 2013/0182712 A1 | 7/2013 | Aguayo et al. |
| 2013/0185413 A1 | 7/2013 | Beaty et al. |
| 2013/0185433 A1 | 7/2013 | Zhu et al. |
| 2013/0191106 A1 | 7/2013 | Kephart et al. |
| 2013/0198050 A1 | 8/2013 | Shroff et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0232492 A1 | 9/2013 | Wang |
| 2013/0246588 A1 | 9/2013 | Borowicz et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0016476 A1 | 1/2014 | Dietz et al. |
| 2014/0019639 A1 | 1/2014 | Ueno |
| 2014/0040473 A1 | 2/2014 | Ho et al. |
| 2014/0040883 A1 | 2/2014 | Tompkins |
| 2014/0052877 A1 | 2/2014 | Mao |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0108985 A1 | 4/2014 | Scott et al. |
| 2014/0122560 A1 | 5/2014 | Ramey et al. |
| 2014/0141720 A1 | 5/2014 | Princen et al. |
| 2014/0156557 A1 | 6/2014 | Zeng et al. |
| 2014/0160924 A1 | 6/2014 | Pfautz et al. |
| 2014/0164486 A1 | 6/2014 | Ravichandran et al. |
| 2014/0189095 A1 | 7/2014 | Lindberg et al. |
| 2014/0189125 A1 | 7/2014 | Amies et al. |
| 2014/0222953 A1 | 8/2014 | Karve et al. |
| 2014/0269266 A1 | 9/2014 | Filsfils et al. |
| 2014/0280805 A1 | 9/2014 | Sawalha |
| 2014/0282536 A1 | 9/2014 | Dave et al. |
| 2014/0282611 A1 | 9/2014 | Campbell et al. |
| 2014/0282669 A1 | 9/2014 | McMillan |
| 2014/0282889 A1 | 9/2014 | Ishaya et al. |
| 2014/0297569 A1 | 10/2014 | Clark et al. |
| 2014/0317261 A1 | 10/2014 | Shatzkamer et al. |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0372582 A1 | 12/2014 | Ghanwani et al. |
| 2015/0006470 A1 | 1/2015 | Mohan |
| 2015/0043335 A1 | 2/2015 | Testicioglu et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |

(56) References Cited

U.S. PATENT DOCUMENTS

| | | |
|---|---|---|
| 2015/0058459 A1 | 2/2015 | Amendjian et al. |
| 2015/0058557 A1 | 2/2015 | Madhusudana et al. |
| 2015/0070516 A1 | 3/2015 | Shoemake et al. |
| 2015/0071285 A1 | 3/2015 | Kumar et al. |
| 2015/0081762 A1 | 3/2015 | Mason et al. |
| 2015/0089478 A1 | 3/2015 | Cheluvaraju et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0109923 A1 | 4/2015 | Hwang |
| 2015/0117458 A1 | 4/2015 | Gurkan et al. |
| 2015/0120914 A1 | 4/2015 | Wada et al. |
| 2015/0149828 A1 | 5/2015 | Mukerji et al. |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0271199 A1 | 9/2015 | Bradley et al. |
| 2015/0281067 A1 | 10/2015 | Wu |
| 2015/0281113 A1 | 10/2015 | Siciliano et al. |
| 2015/0319063 A1 | 11/2015 | Zourzouvillys et al. |
| 2015/0326524 A1 | 11/2015 | Tankala et al. |
| 2015/0373108 A1 | 12/2015 | Fleming et al. |
| 2015/0379062 A1 | 12/2015 | Vermeulen et al. |
| 2016/0062786 A1 | 3/2016 | Meng et al. |
| 2016/0065417 A1 | 3/2016 | Sapuram et al. |
| 2016/0094398 A1 | 3/2016 | Choudhury et al. |
| 2016/0094643 A1 | 3/2016 | Jain et al. |
| 2016/0094894 A1 | 3/2016 | Inayatullah et al. |
| 2016/0099847 A1 | 4/2016 | Melander et al. |
| 2016/0099873 A1 | 4/2016 | Gerö et al. |
| 2016/0103838 A1 | 4/2016 | Sainani et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0147676 A1 | 5/2016 | Cha et al. |
| 2016/0162436 A1 | 6/2016 | Raghavan et al. |
| 2016/0188527 A1 | 6/2016 | Cherian et al. |
| 2016/0226755 A1 | 8/2016 | Hammam et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0292611 A1 | 10/2016 | Boe et al. |
| 2016/0352682 A1 | 12/2016 | Chang |
| 2016/0378389 A1 | 12/2016 | Hrischuk et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0034199 A1 | 2/2017 | Zaw |
| 2017/0041342 A1 | 2/2017 | Efremov et al. |
| 2017/0054659 A1 | 2/2017 | Ergin et al. |
| 2017/0063674 A1 | 3/2017 | Maskalik et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0126583 A1 | 5/2017 | Xia |
| 2017/0147297 A1 | 5/2017 | Krishnamurthy et al. |
| 2017/0163569 A1 | 6/2017 | Koganti |
| 2017/0192823 A1 | 7/2017 | Karaje et al. |
| 2017/0264663 A1 | 9/2017 | Bicket et al. |
| 2017/0302521 A1 | 10/2017 | Lui et al. |
| 2017/0310556 A1 | 10/2017 | Knowles et al. |
| 2017/0317932 A1 | 11/2017 | Paramasivam |
| 2017/0339070 A1 | 11/2017 | Chang et al. |
| 2018/0069885 A1 | 3/2018 | Patterson et al. |
| 2018/0173372 A1 | 6/2018 | Greenspan et al. |
| 2018/0174060 A1 | 6/2018 | Velez-Rojas et al. |

FOREIGN PATENT DOCUMENTS

| | | |
|---|---|---|
| CN | 102164091 | 8/2011 |
| CN | 102918499 | 2/2013 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Amedro, Brian, et al., "An Efficient Framework for Running Applications on Clusters, Grids and Cloud," 2010, 17 pages.

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "A Look at DeltaCloud: The Multi-Cloud API," Feb. 17, 2012, 4 pages.

Author Unknown, "About Deltacloud," Apache Software Foundation, Aug. 18, 2013, 1 page.

Author Unknown, "Architecture for Managing Clouds, A White Paper from the Open Cloud Standards Incubator," Version 1.0.0, Document No. DSP-IS0102, Jun. 18, 2010, 57 pages.

Author Unknown, "Cloud Infrastructure Management Interface—Common Information Model (CIMI-CIM)," Document No. DSP0264, Version 1.0.0, Dec. 14, 2012, 21 pages.

Author Unknown, "Cloud Infrastructure Management Interface (CIMI) Primer," Document No. DSP2027, Version 1.0.1, Sep. 12, 2012, 30 pages.

Author Unknown, "cloudControl Documentation," Aug. 25, 2013, 14 pages.

Author Unknown, "Interoperable Clouds, A White Paper from the Open Cloud Standards Incubator," Version 1.0.0, Document No. DSP-IS0101, Nov. 11, 2009, 21 pages.

Author Unknown, "Microsoft Cloud Edge Gateway (MCE) Series Appliance," Iron Networks, Inc., 4 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.

Author Unknown, "Real-Time Performance Monitoring on Juniper Networks Devices, Tips and Tools for Assessing and Analyzing Network Efficiency," Juniper Networks, Inc., May 2010, 35 pages.

Author Unknown, "Use Cases and Interactions for Managing Clouds, A White Paper from the Open Cloud Standards Incubator," Version 1.0.0, Document No. DSP-IS00103, Jun. 16, 2010, 75 pages.

Beyer, Steffen, "Module "Data::Locations?!"," YAPC::Europe, London, UK,ICA, Sep. 22-24, 2000, XP002742700, 15 pages.

Bohner, Shawn A., "Extending Software Change Impact Analysis into COTS Components," 2003, IEEE, 8 pages.

Borovick, Lucinda, et al., "Architecting the Network for the Cloud," IDC White Paper, Jan. 2011, 8 pages.

Bosch, Greg, "Virtualization," last modified Apr. 2012 by B. Davison, 33 pages.

Broadcasters Audience Research Board, "What's Next," http://lwww.barb.co.uk/whats-next, accessed Jul. 22, 2015, 2 pages.

Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.

Cisco Systems, Inc., "Cisco Unified Network Services: Overcome Obstacles to Cloud-Ready Deployments," Cisco White Paper, Jan. 2011, 6 pages.

Cisco Systems, Inc., "Cisco Intercloud Fabric: Hybrid Cloud with Choice, Consistency, Control and Compliance," Dec. 10, 2014, 22 pages.

Cisco Technology, Inc., "Cisco Expands Videoscape TV Platform Into the Cloud," Jan. 6, 2014, Las Vegas, Nevada, Press Release, 3 pages.

(56) References Cited

OTHER PUBLICATIONS

Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS CORP, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
De Canal, Marco, "Cloud Computing: Analisi Dei Modelli Architetturali E Delle Technologie Per Lo Sviluppo Di Applicazioni," 2011-2012, 149 pages.
Fang K., "LISP MAC-EID-TO-RLOC Mapping (LISP based L2VPN)," Network Working Group, Internet Draft, CISCO Systems, Jan. 2012, 12 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Hood, C. S., et al., "Automated Proactive Anomaly Detection," 1997, Springer Science and Business Media Dordrecht, pp. 688-699.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed. Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Toews, Everett, "Introduction to Apache jclouds," Apr. 7, 2014, 23 pages.
Vilalta R., et al., "An efficient approach to external cluster assessment with an application to martian topography," Feb. 2007, 23 pages, Data Mining and Knowledge Discovery 14.1: 1-23. New York: Springer Science & Business Media.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title-Filter_%28software%29&oldid=594544359.
Wikipedia; "Pipeline (Unix)", Wikipedia, May 4, 2014, 4 pages, https://en.wikibedia.org/w/index.php?title-Pipeline2/028Unix%29&oldid=606980114.

\* cited by examiner

SELECTIVE LOAD BALANCING OF NETWORK TRAFFIC

RELATED APPLICATIONS

The instant application is a Continuation of, and claims priority to, U.S. patent application Ser. No. 14/693,925, entitled SELECTIVE LOAD BALANCING OF NETWORK TRAFFIC, filed Apr. 23, 2015, which claims the benefit of U.S. Provisional Application Ser. No. 62/143,081, entitled SYSTEMS AND METHODS FOR PRUNING AND LOAD BALANCING NETWORK TRAFFIC, filed Apr. 4, 2015, the contents of which are herein incorporated by reference in their entireties.

TECHNICAL FIELD

This disclosure relates in general to the field of communications and, more particularly, to selective load balancing of network traffic.

BACKGROUND

A network element may include one or more ingress ports and one or more egress ports. The network element may receive network traffic through the ingress ports. As an example, network traffic may include one or more packets containing control information and data. The network element may perform various operations on the network traffic to select one or more of the egress ports for forwarding the network traffic. The network element then forwards the network traffic on to one or more devices coupled to the network element through the one or more egress ports.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment, load balancing criteria and an indication of a plurality of network nodes is received. A plurality of forwarding entries are created based on the load balancing criteria and the indication of the plurality of nodes. A content addressable memory of a network element is programmed with the plurality of forwarding entries. The network element selectively load balances network traffic by applying the plurality of forwarding entries to the network traffic, wherein network traffic meeting the load balancing criteria is load balanced among the plurality of network nodes.

Example Embodiments

Figure 1:
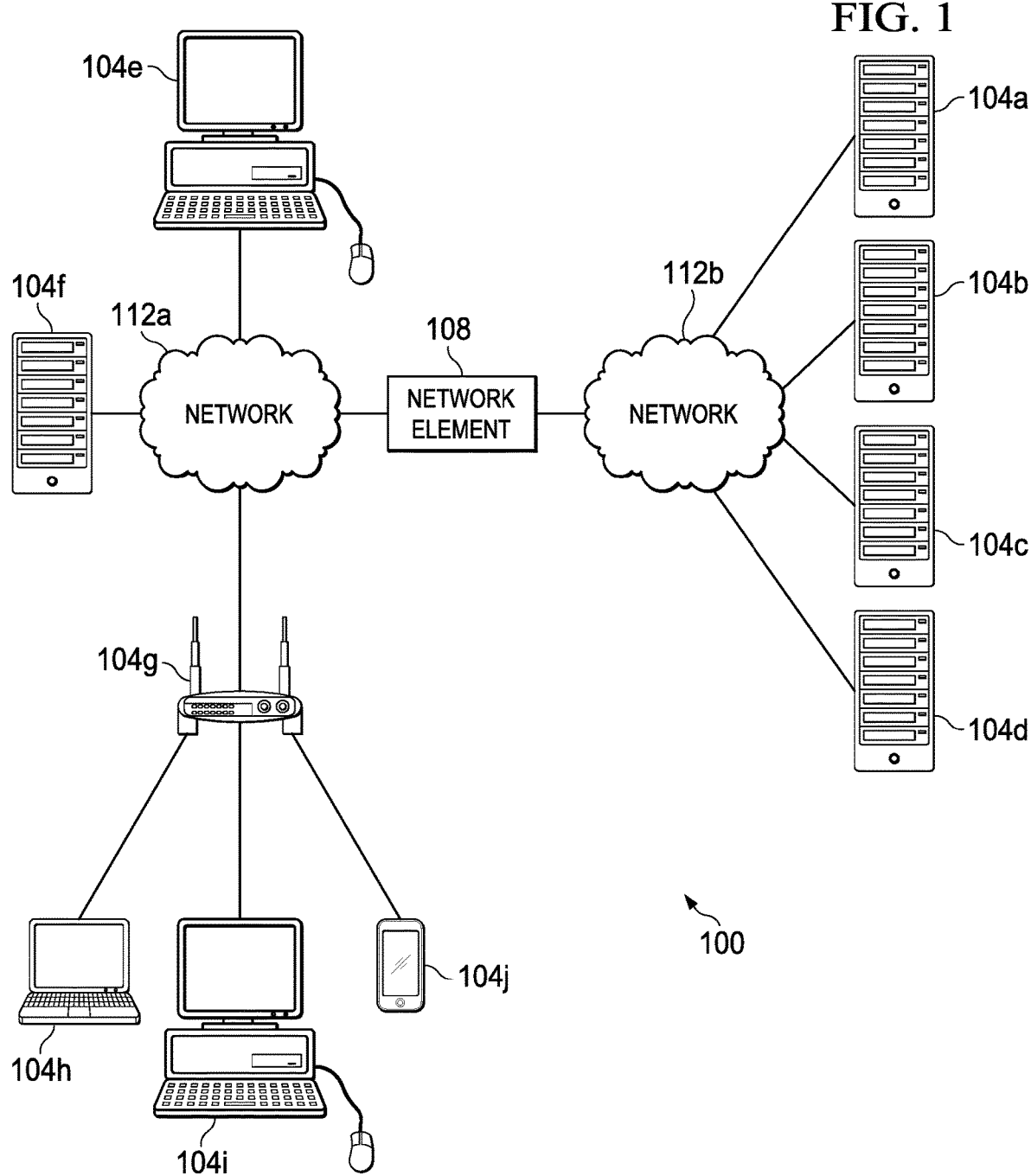
FIG. 1 illustrates a block diagram of a system for selective load balancing of network traffic in accordance with certain embodiments.

FIG. 1 illustrates a block diagram of a system 100 for selectively load balancing network traffic in accordance with certain embodiments. System 100 includes various network nodes 104 coupled to network element 108 via networks 112. In operation, network element 108 forwards network traffic (e.g., data packets) from one or more network nodes 104 or an internal component of network element 108 to one or more other network nodes 104 or an internal component of network element 108. Network element 108 may implement various load balancing criteria received from a network administrator associated with network element 108. As an example, a network administrator may instruct network element 108 to load balance traffic that matches the criteria and to forward traffic that does not meet the criteria in a normal manner. Thus, the network element 108 may provide customization of the traffic forwarding by a network administrator.

As the number of network nodes in a network increases, complexity in the network increases as well. As the network complexity increases, implementation of customized traffic forwarding rules may require additional hardware and/or software resources, power, and time to implement, particularly if the customization is implemented in a serial fashion. For example, if a user desires to selectively load balance traffic, the user may need to configure multiple pieces of equipment. For example, the user may configure a first line card to select particular traffic that is then sent to a second line card that performs the load balancing. Alternatively, a network appliance may be used to select and load balance traffic, but this would introduce latency that is undesirable in a network element, such as a network switch, that is used for high speed bridging and/or routing operations since a network appliance would perform these functions in software (i.e., a processor of the network appliance would execute instructions in order to perform these functions).

Various embodiments of the present disclosure provide systems and methods for simultaneous traffic selection and load-balancing operations. Such embodiments provide efficient utilization of network element 108's resources and faster operation than systems that perform traffic forwarding customization operations in a serial fashion and/or in software. In particular embodiments, a traffic selection command and a redirection command may be merged and may be applied to network traffic in a single clock cycle of network element 108.

Network element 108 may be any device or system operable to forward traffic in conjunction with customized rules. For example, network elements may include network switches, routers, servers (physical servers or servers virtually implemented on physical hardware), machines (physical machine or machines virtually implemented on physical hardware), end user devices, access points, cable boxes, gateways, bridges, loadbalancers, firewalls, inline service nodes, proxies, processors, modules; other suitable devices, components, elements, proprietary appliances, or objects operable to exchange, receive, and transmit information in a network environment; or a combination of two or more of these. A network element may include any suitable hardware, software, components, modules, interfaces, or objects that facilitate operations associated with selectively load-balancing network traffic. This may be inclusive of appropriate algorithms and communication protocols that allow for the effective exchange of data or information. Network element 108 may be deployed in a data center, as an aggregation node (to aggregate traffic from a plurality of access domains), within a core network, or in other suitable configuration.

Similarly, a network node 104 may be any device or system operable to exchange, transmit, and or receive information in a network environment. For example, network nodes may include network switches, routers, servers (physical servers or servers virtually implemented on physical hardware) (e.g., servers 104a-d and 104f), machines (physical machine or machines virtually implemented on physical hardware), end user devices (such as laptop 104h, desktop computers 104e and 104i, smartphone 104j), access points (e.g., 104g), cable boxes, gateways, bridges, loadbalancers, firewalls, inline service nodes, proxies, processors, modules; or any other suitable devices, components, elements, proprietary appliances, objects operable to exchange, receive, and transmit information in a network environment; or a combination of two or more of these. A network node 104 may include any suitable hardware, software, components, modules, interfaces, or objects that facilitate its communications operations. This may be inclusive of appropriate algorithms and communication protocols that allow for the effective exchange of data or information.

A network node 104 or a network element 108 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein. The components of the one or more computer systems may comprise any suitable physical form, configuration, number, type, and/or layout. Where appropriate, one or more computer systems may be unitary or distributed, span multiple locations, span multiple machines, or reside in a cloud, which may include one or more cloud components in one or more networks.

A network 112 represents a series of points, nodes, or network elements of interconnected communication paths for receiving and transmitting packets of information that propagate through a communication system. A network offers a communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium. In some embodiments, a network may simply comprise a cable (e.g., an Ethernet cable), air, or other transmission medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

Figure 2:
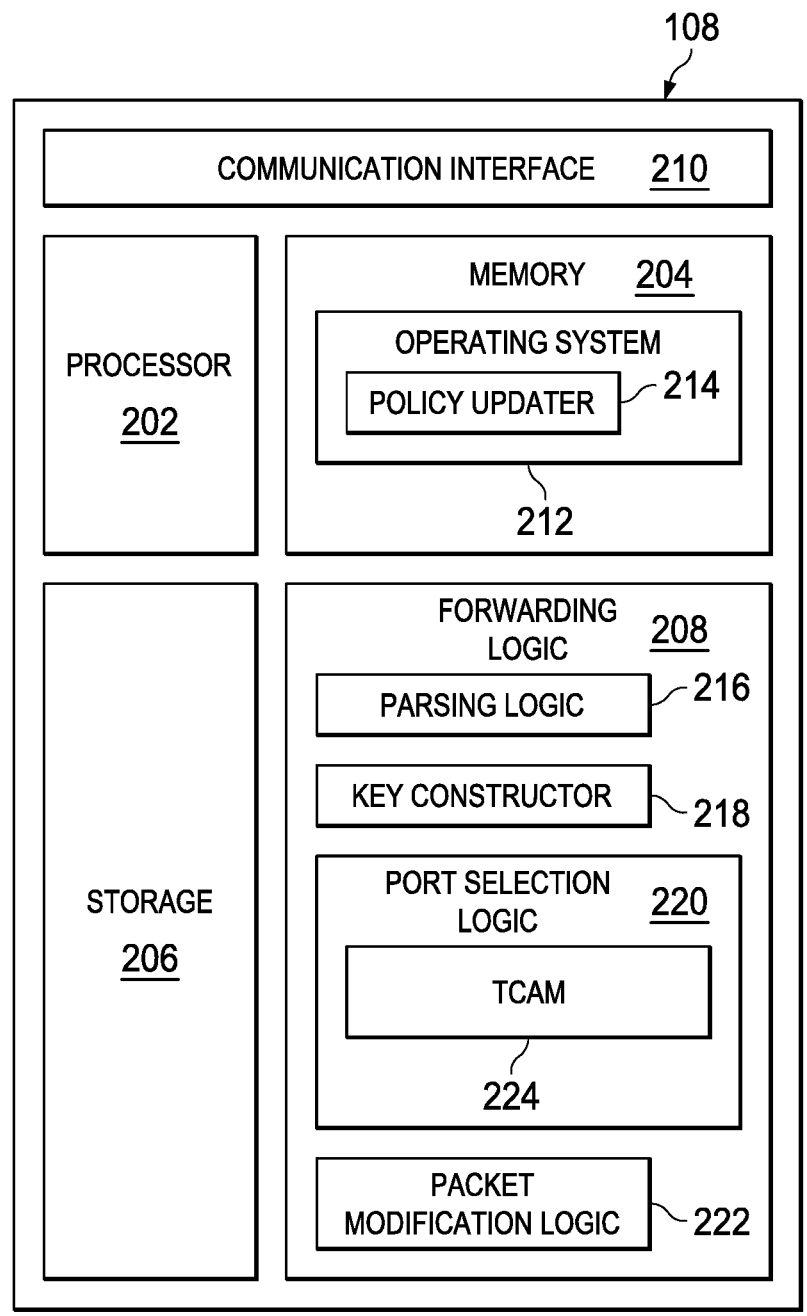
FIG. 2 illustrates a block diagram of a network element that performs selective load balancing in accordance with certain embodiments.

FIG. 2 illustrates a block diagram of a network element 108 in accordance with certain embodiments. In the embodiment depicted, network element 108 includes a computer system to facilitate performance of its operations. In particular embodiments, a computer system may include a processor, memory, storage, one or more communication interfaces, and a display. As an example, network element 108 comprises a computer system that includes one or more processors 202, memory 204, storage 206, and one or more communication interfaces 210. These components may work together in order to provide functionality described herein. Network element may also comprise forwarding logic 208. Forwarding logic 208 may be operable to implement user-specified traffic forwarding rules to traffic received via communication interface 210 and send the results to communication interface 210 for forwarding out of the appropriate port of network element 108.

Communication interface 210 may be used for the communication of signaling and/or data between network element 108 and one or more networks (e.g., 112a or 112b) and/or network nodes 104 coupled to a network 112. For example, communication interface 210 may be used to send and receive network traffic such as data packets. Each communication interface 210 may send and receive data and/or signals according to a distinct standard such as Asynchronous Transfer Mode (ATM), Frame Relay, or Gigabit Ethernet (or other IEEE 802.3 standard). In a particular embodiment, communication interface 210 comprises one or more ports that may each function as an ingress and/or egress port. As one example, communication interface 210 may comprise a plurality of Ethernet ports.

Processor 202 may be a microprocessor, controller, or any other suitable computing device, resource, or combination of hardware, stored software and/or encoded logic operable to provide, either alone or in conjunction with other components of network element 108, network element functionality. In some embodiments, network element 108 may utilize multiple processors to perform the functions described herein.

The processor can execute any type of instructions to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Memory 204 and/or storage 206 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 204 and/or storage 206 may store any suitable data or information utilized by network element 108, including software embedded in a computer readable medium, and/or encoded logic incorporated in hardware or otherwise stored (e.g., firmware). Memory 204 and/or storage 206 may also store the results and/or intermediate results of the various calculations and determinations performed by processor 202.

In certain example implementations, the customized traffic forwarding functions outlined herein may be implemented by logic encoded in one or more non-transitory, tangible media (e.g., embedded logic provided in an application specific integrated circuit (ASIC), digital signal processor (DSP) instructions, software (potentially inclusive of object code and source code) to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification.

Any of the memory items discussed herein should be construed as being encompassed within the broad term 'memory element.' Similarly, any of the potential processing elements, modules, and machines described in this Specification should be construed as being encompassed within the broad term 'processor.'

In one implementation, a network element 108 described herein may include software to achieve (or to facilitate) the functions discussed herein for customized traffic forwarding where the software is executed on one or more processors 202 to carry out the functions. This could include the implementation of one or more instances of an operating system 212, policy updater 214, and/or any other suitable elements that foster the activities discussed herein. In other embodiments, one or more of these elements may be implemented in hardware and/or firmware such as reprogrammable logic in an FPGA or ASIC.

In some embodiments, the operating system 212 provides an application program interface (API) that allows a network administrator to provide information to the network element 108. For example, the API may allow the network administrator to specify traffic customization information such as one or more load balancing commands (which may include load balancing criteria). In various embodiments, a network administrator may specify the traffic customization information through one or more interfaces, such as a command-line interface (CLI) (e.g., manually entered or entered via a script) or a graphical user interface (GUI) using any suitable programming language (e.g., Extensible Markup Language (xml) or Python).

The operating system 212 may be capable of communicating the traffic customization information received from the network administrator to other portions of network element 108 (e.g., to forwarding logic 208). In particular embodiments, the operating system 212 is operable to utilize a policy updater 214 to program logic of network element 108 based on traffic customization information received by the operating system 212 (e.g., from the network administrator).

In various embodiments, the operating system 212 receives load balancing commands and communicates with forwarding logic 208 to implement these commands. In various embodiments, these commands are converted into a format suitable for use by forwarding logic 208 (e.g., "forwarding entries" as described herein) before being communicated to forwarding logic 208. In other embodiments, the load balancing commands are received by the operating system 212 in a format used by forwarding logic 208, such that no conversion is needed. In yet other embodiments, forwarding logic 208 may convert the load balancing commands into a format suitable for use by forwarding logic 208. In some embodiments, a load balancing command may specify that it should be applied to a single port of network element 108 or to multiple ports of the network element.

A load balancing command may specify that traffic matching certain criteria should be load balanced among a plurality of network nodes. Any suitable matching criteria may be specified, such as one or more identifiers associated with the source and/or destination of an incoming data packet. For example, the matching criteria may include one or more source addresses (e.g., IP addresses, media access control (MAC) addresses, or other addresses identifiable in a data packet) and/or one or more destination addresses (e.g., IP addresses, MAC addresses, or other addresses). In some embodiments, the matching criteria may alternatively or additionally include one or more protocols (e.g., one or more L3 protocols such as IPv4 or IPv6, one or more L4 protocols such as TCP or User Datagram Protocol (UDP)), one or more quality of service parameters (QoS), one or more virtual local area network (VLAN) identifiers, and/or other suitable information associated with (e.g., specified by) the packet. As another example, the matching criteria may include one or more source or destination L4 ports associated with (e.g., specified by) the packet.

A load balancing command may specify a load balancing scheme. For example, with respect to the embodiment depicted in FIG. 1, a load balancing scheme may specify how traffic forwarded by network element 108 is to be distributed among servers 104*a-d*. Network element 108 may load balance among any number of suitable network nodes 104, such as firewalls, application servers, other load balancers (e.g., load balancers that perform load balancing in software), inspection devices, etc.

In particular embodiments, a user may provide a load balancing command specifying that particular traffic is load balanced while other traffic is not load balanced (e.g., the other traffic may be blocked or routed normally through a forwarding table). In one embodiment, a network administrator or other entity associated with network element 108 may specify one or more destination addresses (e.g., a virtual IP address or range of virtual IP addresses of the network element 108) and one or more L4 parameters (such as one or more L4 protocols and/or L4 destination ports) as load balancing criteria. Thus traffic matching this criteria will be load balanced among available load balancing network nodes while traffic not matching this criteria will be handled in another manner (e.g., according to a forwarding table). In some embodiments, this criteria may be applied to traffic received at a particular port, at a group of logically associated ports, or at all ports of the network element 108.

In some embodiments, a load balancing command may be expressed at a higher level of abstraction than one or more corresponding forwarding entries that are created based on the load balancing command. For example, a load balancing command may merely specify that network traffic is to be split evenly among available servers of a device group (e.g., the four servers 104*a-d*) while the resulting forwarding entries may specify matching criteria and redirection information to implement the load balancing scheme specified by the load balancing command. As an example, network element 108 may receive a load balancing command to load balance incoming traffic among a plurality of network nodes and may create a forwarding entry for each network node that specifies a distinct range of source IP addresses. Thus, when incoming network traffic matches the address range specified in a particular forwarding entry, the network traffic is redirected to the network node specified in the forwarding entry. In various embodiments, the forwarding entries may have other load balancing criteria that must also be met in order to be applied to incoming network traffic, such as any of the criteria described above.

The load balancing commands may be generated by any suitable entity, such as the network administrator or various features of network element 208. When a load balancing command is generated or received by a component of network element 108, the load balancing command may be passed to the operating system 212 which then communicates the command or resulting forwarding entries to port selection logic 220. In various embodiments, operating system 212 or other network element component may update the forwarding entries resulting from the load balancing command in response to a change in network topology (e.g., when an additional network node 104 becomes available to load balance or one of the network nodes 104a-d goes down). In particular embodiments, this may include changing a range of source IP addresses specified in each forwarding entry such that network traffic is distributed evenly (or otherwise) among the available network nodes 104 in accordance with the load balancing command.

In particular embodiments, operating system 212 creates one or more additional forwarding entries after generating the forwarding entries from the load balancing command(s) and/or other commands. For example, if the existing forwarding entries do not cover each possible scenario, a default forwarding entry (that may be applied if no other match is found) may be generated that denies all traffic (e.g., if the forwarding entries include one or more entries permitting certain traffic) or permits all traffic (e.g., if the forwarding entries include one or more entries denying certain traffic). In various embodiments, the traffic forwarding entries may be placed in order of priority such that a traffic forwarding entry with a higher priority is checked for a match with a packet to be forwarded before the traffic forwarding entry with the lower priority is checked for a match with the packet. In other embodiments, traffic forwarding entries may each have a priority assigned to them, such that if network traffic matches multiple traffic forwarding entries, the traffic forwarding entry with the highest priority will be applied to the traffic. In some embodiments, a default forwarding entry (e.g., a forwarding entry specifying that all traffic should be permitted) has the lowest priority of the traffic forwarding entries. In various embodiments, the priorities of the traffic forwarding entries are based on user-specified rules associated with the load balancing and/or other commands that are merged to form the traffic forwarding entries.

As mentioned earlier, the policy updater 214 may be responsible for sending the forwarding entries to the forwarding logic 208 to be implemented. As one example, the policy updater 214 may instruct that the forwarding entries be programmed into a memory such as a content addressable memory (e.g., TCAM 224) of the port selection logic 220 (e.g., by calling a hardware driver associated with the TCAM).

Forwarding logic 208 is operable to apply the forwarding entries to network traffic received by network element 108. In the embodiment depicted, forwarding logic 208 includes parsing logic 216, key construction logic 218, port selection logic 220, and packet modification logic 222. In various embodiments, any suitable portion of forwarding logic 208 may comprise programmable logic (e.g., software/computer instructions executed by a processor), fixed logic, programmable digital logic (e.g., an FPGA, an EPROM, an EEPROM, or other device), an ASIC that includes digital logic, software, code, electronic instructions, or any suitable combination thereof. In a particular embodiment, forwarding logic 208 comprises an ASIC or other device that is operable to perform customized traffic forwarding in hardware by utilizing logic (e.g., one or more memories such as TCAM 224) that is reprogrammable by an entity (e.g., the operating system 212) based on traffic customization information (e.g., received from a network administrator). In such an embodiment, the functions of parsing logic 216, key construction logic 218, port selection logic 220, and packet modification logic 222 are performed in hardware by such logic (in contrast to an implementation where such functions may be performed through software instructions executed by a network processor). Reconfiguration of the logic may be performed by storing different values in memory of the forwarding logic 208 such as TCAM 224 or other memory element. In various embodiments, the values stored in the memory may provide control inputs to forwarding logic 208, but are not typical instructions that are part of an instruction set executed by a processor. By implementing this logic in hardware, the network element 108 may process incoming traffic (e.g., switch/bridge the traffic) at much higher speeds (e.g., at line rate) than an appliance that utilizes a network processor to process incoming network traffic.

Parsing logic 216 may be operable to receive packets from the ingress ports of network element 108. The parsing logic 216 may be configured to parse information from a received packet. Parsing logic 216 may be configured to parse any suitable information, such as one or more protocols associated with (e.g., included within) the packet, a source address (e.g., IP address, MAC address, or other address) of the packet, a destination address (e.g., IP address, MAC address, or other address) of the packet, one or more ports (e.g., source or destination L4 port) associated with the packet, a VLAN identifier, a quality of service (QoS value), or other suitable information from the packet. In some embodiments, the information to be parsed by parsing logic 216 is based on the information needed for various forwarding entries of network element 108 (which could include forwarding entries associated with various different ports of network element 108). In some embodiments, the parsing logic 216 is configured on a port-by-port basis, such that packets from each port may be parsed based on the forwarding entries associated with that port.

The information parsed by parsing logic 126 is passed to key construction logic 218. Key construction logic constructs a key from the output of the parsing logic 126. The key may contain all or a portion of the information parsed from a packet. The key is then passed to the port selection logic 220.

Prior to receiving a key associated with a data packet, port selection logic 208 may receive forwarding entries (or commands) from operating system 212 and configure itself to implement the forwarding entries. For example, port selection logic 208 may store forwarding entries associated with a particular port in a content addressable memory, such as a TCAM 224. When a packet is received on that port, the key generated by key construction logic 218 (and any other suitable information associated with the packet) may be passed to the port selection logic 220. The port selection logic 220 uses the key to perform a lookup in the TCAM 224. Port selection logic 220 will then forward the traffic through the appropriate port of network element 108 in accordance with the forwarding entry that matches the information in the key from the packet (and has the highest priority if multiple forwarding entries match the key). If the packet is to be redirected (e.g., because the key matches the specified load balancing criteria), packet modification logic may modify the appropriate fields of the packet (e.g., destination IP address and/or destination MAC address) before the packet is forwarded out of the appropriate egress port of network element 108. If the packet is not to be redirected according to load balancing criteria, then the usual forwarding process may be applied to the packet. For example, port selection logic 218 may access a forwarding table (e.g., based on a destination address of the packet) to determine which port to forward the packet to. In some embodiments, the forwarding table is stored in a separate memory (e.g., static random access memory) from the forwarding entries (e.g., TCAM 224).

Figure 3:
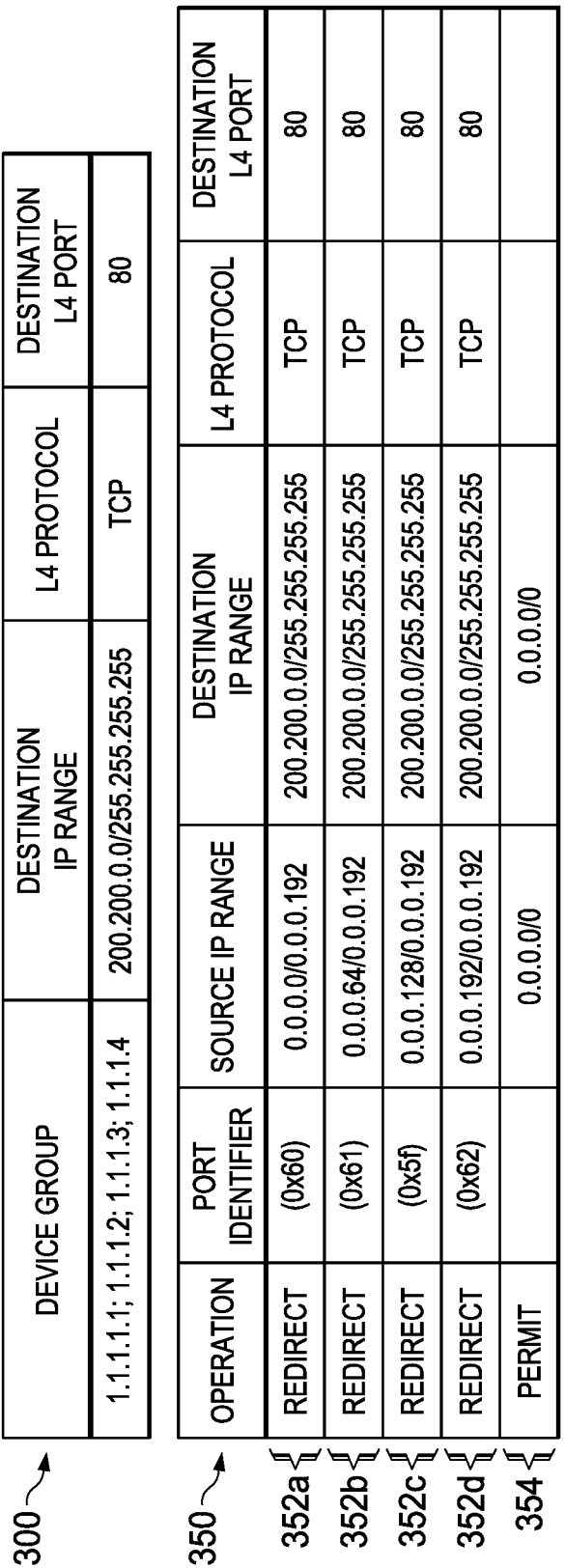
FIG. 3 illustrates example load balancing criteria and traffic forwarding entries in accordance with certain embodiments.

FIG. 3 illustrates example load balancing criteria and traffic forwarding entries in accordance with certain embodiments. In the embodiment depicted, block 300 represents example load balancing criteria and block 350 represents example traffic forwarding entries 352 and 354. In various embodiments, such entries could be utilized by forwarding logic 208 (e.g., the entries may be stored in TCAM 224 and utilized by hardware to forward incoming network traffic).

The load balancing criteria in block 300 specify a destination IP address expressed as an IP address ("200.200.0.0") and a mask ("255.255.255.255"). When compared against a destination IP address of an incoming data packet, the mask may be applied to the IP address of the packet (e.g., a logical AND operation may be applied with the mask and the destination IP address) and the result is compared against the IP address specified in the load balancing criteria to determine whether a match occurs. This allows specification of one IP address or multiple IP addresses using a common format (i.e., IP address and mask). In various embodiments, the destination IP address(es) specified in the load balancing criteria may be one or more virtual IP addresses of network element 108.

The example load balancing criteria also depicts an L4 protocol ("TCP") and an L4 port ("80"). Thus the load balancing criteria in this depiction specifies that network traffic specifying a destination IP address of 200.200.0.0, an L4 protocol of TCP, and a destination L4 port of 80 (thus signifying Hypertext Transfer Protocol (HTTP) traffic) will be load balanced. Other protocols and/or ports may be specified in the load balancing criteria. For example, if the L4 protocol is TCP and/or UDP, the L4 destination port could be 20 (signifying File Transfer Protocol (FTP) data traffic), 25 (signifying Simple Mail Transfer Protocol (SMTP) traffic), 53 (signifying Domain Name System (DNS) traffic), other suitable port number, or a combination of any of these.

As depicted the load balancing criteria is associated with a device group. A device group may be one or more network nodes 104 associated with load balancing criteria. In the embodiment depicted, the network nodes 104 are depicted by IP addresses ("1.1.1.1", "1.1.1.2", "1.1.1.3", and "1.1.1.4"), though network nodes may be identified in any suitable manner. The network traffic matching the destination IP range, L4 protocol, and L4 destination port specified by the load balancing criteria may be load balanced among the network nodes specified by the device group.

Block 350 represent traffic forwarding entries that may be produced based on the load balancing criteria specified in block 300. The forwarding entries 352 each correspond to a network node in the device group. Each network node is coupled to a port of the network element 108 identified by one of the port identifiers (e.g., 0x60, 0x61, 0x5f, and 0x62). Each forwarding entry 352 specifies that traffic having a destination IP address of 200.200.0.0, an L4 protocol of TCP, and an L4 port 80 will be redirected to the specified port (and corresponding network node) based on its source IP address. As explained in the load balancing criteria, the IP address ranges may be specified in IP address/mask format (where the mask is applied to the IP address of the traffic and compared against the IP address specified in the IP range), though in other embodiments the ranges may be specified in any suitable manner. Each of the forwarding entries 352 will result in the redirection of traffic matching the load balancing criteria to a different port based on the value of the last octet of the source IP address of the traffic. In this example, the traffic is load balanced evenly across the network nodes of the device group, though in other embodiments a heavier load of traffic could be redirected to a particular network node if desired by specifying a larger range of source IP addresses in the forwarding entry corresponding to that network node.

In the embodiment depicted, block 350 also depicts a forwarding entry that permits traffic regardless of the source IP address or destination IP address. For example, entry 354 denotes allowable IP addresses for the source IP address and the destination IP address in Classless Inter-Domain Routing (CIDR) notation, though any suitable notation may be used. In the embodiment depicted, this forwarding entry would have a lower priority than forwarding entries 352 such that it would only be applied if network traffic didn't match any of the forwarding entries 352. The permitted traffic that does not match one of the load balancing forwarding entries would be forwarded in a normal manner (e.g., based on a destination MAC address of the packet using a forwarding table).

This embodiment is a simplified example. In other embodiments, other actions may be applied to incoming traffic. For example, particular traffic could be redirected, blocked, or permitted according to any suitable criteria set by the network administrator, network element 108, and/or other entity.

Figure 4:
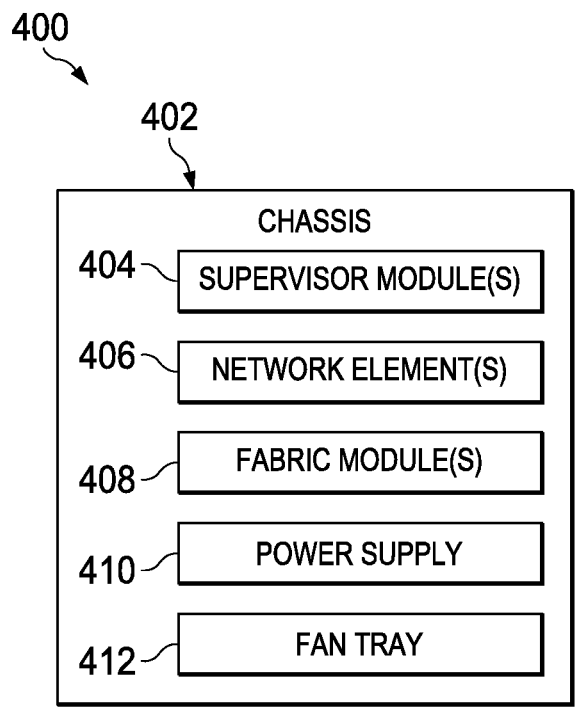
FIG. 4 illustrates a block diagram of one or more network elements embodied within a chassis in accordance with certain embodiments.

FIG. 4 illustrates a block diagram 400 of one or more network elements embodied within a chassis 402 in accordance with certain embodiments. Chassis 402 may include various slots configured to electrically and mechanically couple to various circuit boards (e.g., line cards), such as one or more supervisor module(s) 404, one or more network elements(s) 406, one or more fabric module(s) 408, one or more power supplies (410), one or more fan trays 412, or other components. In various embodiments, a network element 408 may correspond to network element 108. In other embodiments, the entire chassis 402 may correspond to network element 108.

A supervisor module 404 may include a computer system with at least one processor and may be operable to scale the control plane, management, and data plane services for the chassis and its components. A supervisor module 404 may control the Layer 2 and 3 services, redundancy capabilities, configuration management, status monitoring, power and environmental management of the chassis and its components. In some embodiments, supervisor module 404 provides centralized arbitration to the system fabric for all line cards.

Cisco NX-OS is designed to support distributed multi-threaded processing on symmetric multiprocessors (SMPs), multicore CPUs, and distributed line-card processors. Computationally intensive tasks, such as hardware table programming, can be offloaded to dedicated processors distributed across the line cards. Cisco NX-OS modular processes may be instantiated on demand, each in a separate protected memory space. Thus, processes are started and system resources allocated only when a feature is enabled.

In a particular embodiment supervisor module 404 receives commands from users, processes these commands, and sends relevant configuration information to the network elements 406. For example, a user may send a load balancing or other command to supervisor module 404. Supervisor module may generate traffic forwarding entries based on the rules. Supervisor module 404 may also determine which ports the commands apply to and then send the forwarding entries to the relevant network element 406.

Network element 406 may include a distributed forwarding engine for L2/L3 forwarding. Network element 406 may include integrated hardware support for protecting the supervisor CPU from excessive traffic; for providing ACL counters and logging capability, for providing Layer 2 to Layer 4 ACL for both IPv4 and IPv6 traffic, and any other characteristics described herein with respect to network element 108.

Fabric module 408 is capable of coupling the various network elements 406 in the chassis together (e.g., through their respective ports). In connection with the supervisor module 404 and network elements 406, the fabric module 408 may provide virtual output queuing (VoQ) and credit-based arbitration to a crossbar switch to increase performance of the distributed forwarding system implemented by chassis 402.

Chassis 402 may also include one or more power supplies 410 for powering the various components of chassis 402 and one or more fan trays 412 for cooling the various components of chassis 402.

Figure 5:
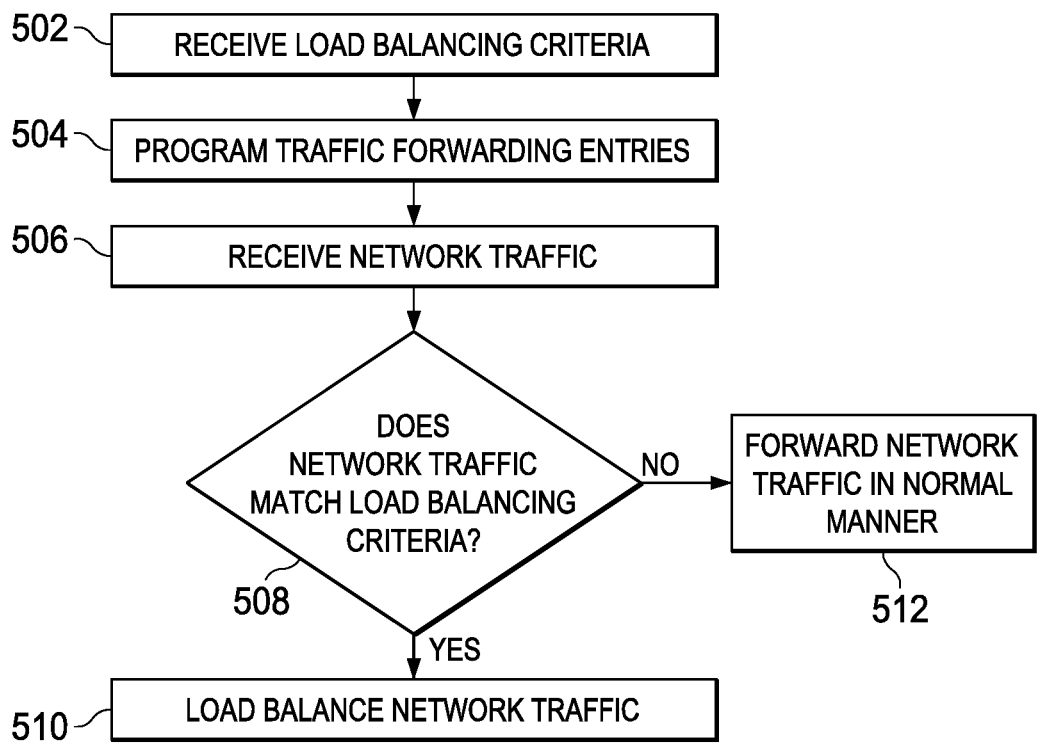
FIG. 5 illustrates an example method for selectively load balancing network traffic in accordance with certain embodiments.

FIG. 5 illustrates an example method for selectively load balancing network traffic in accordance with certain embodiments. The method begins at step 502, where load balancing criteria is received (e.g., from a network administrator). At step 504, traffic forwarding entries based are formed based on the load balancing criteria and programmed into a memory of a network element 108.

At step 506, network traffic is received. At step 508 it is determined whether the network traffic matches the load balancing criteria specified in step 502. If it does, the network traffic is load balanced among a group of network nodes associated with the load balancing criteria at step 510. If it does not, the network traffic may be forwarded in a normal manner. For example, the traffic may be blocked based on other forwarding entries or forwarded based on a forwarding table of the network element.

Some of the steps illustrated in FIG. 5 may be repeated, combined, modified or deleted where appropriate, and additional steps may also be added to the flowchart. Additionally, steps may be performed in any suitable order without departing from the scope of particular embodiments.

It is also important to note that the steps in FIG. 5 illustrate only some of the possible scenarios that may be executed by, or within, the network elements described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by the network elements 108 in that any suitable arrangements, chronologies, configurations, and timing mechanisms may be provided without departing from the teachings of the present disclosure.

Additionally, it should be noted that with the examples provided above, interaction may be described in terms of one or more network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of selectively load balancing network traffic, as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    programming a network element with a plurality of forwarding entries to enable load balancing of network traffic, each of the plurality of forwarding entries including one of a plurality of variable ranges of internet protocol (IP) addresses, each of the plurality of variable ranges including a first IP address defining a low end of a respective one of the plurality of variable ranges and a second IP address defining a high end of the respective one of the plurality of variable ranges;
    receiving, via the network element, the network traffic; and
    performing, via the network element, the load balancing of the network traffic based on the plurality of variable ranges.

2. The method of claim 1, further comprising:
    receiving load balancing criteria, the load balancing criteria defining a portion of the plurality of variable ranges using one or more destination IP addresses.

3. The method of claim 2, wherein the one or more destination IP addresses corresponds to one or more virtual IP addresses of the network element.

4. The method of claim 1, further comprising:
    receiving load balancing criteria with a layer 4 protocol.

5. The method of claim 1, further comprising:
    receiving load balancing criteria with a layer 4 destination port.

6. The method of claim 1, further comprising:
    receiving load balancing criteria; and
    accessing a forwarding table of the network element for network traffic that does not meet the load balancing criteria,
    wherein, the forwarding table of the network element is accessed to determine an egress port for the network traffic that does not meet the load balancing criteria, the forwarding table is based on a destination IP address of a packet of the network traffic that does not meet the load balancing criteria, and the forwarding table is stored in another memory separate from a content addressable memory of the network element with the plurality of forwarding entries.

7. The method of claim 1, wherein each of the plurality of forwarding entries specifies another indication of a port to forward network traffic matching load balancing criteria and comprises a source IP address within a range of source IP addresses.

8. The method of claim 1, wherein the network element determines whether any of the plurality of forwarding entries applies to a data packet of the network traffic in a single clock cycle of the network element.

9. The method of claim 1, further comprising:

receiving load balancing criteria via a command line interface from a user of the network element.

10. The method of claim 1, wherein the plurality of forwarding entries are stored in a ternary content-addressable memory (TCAM) of the network element.

11. An apparatus comprising:

at least one memory with instructions; and a processor configured to execute the instructions and cause performance of operations comprising:

programming a plurality of forwarding entries to enable load balancing of network traffic, each of the plurality of forwarding entries including a plurality of variable ranges of internet protocol (IP) addresses, each of the plurality of variable ranges including a first IP address defining a low end of a respective one of the plurality of variable ranges and a second IP address defining a high end of the respective one of the plurality of variable ranges, receiving the network traffic, and performing the load balancing of the network traffic based on the plurality of variable ranges.

12. The apparatus of claim 11, wherein the at least one memory includes a ternary content addressable memory.

13. The apparatus of claim 11, wherein each of the plurality of forwarding entries includes an identifier indicating a port through which to forward network traffic matching load balancing criteria and a source IP address within a range of source IP addresses.

14. The apparatus of claim 11, wherein the operations include receiving a load balancing criteria, the load balancing criteria defining a portion of the plurality of variable ranges using one or more destination IP addresses, a layer 4 protocol, and a layer 4 destination port.

15. The apparatus of claim 14, wherein the one or more destination IP addresses corresponds to one or more virtual IP addresses of the apparatus.

16. A computer-readable non-transitory medium comprising one or more instructions that, when executed by a processor, cause the processor to perform operations comprising:

programming a network element with a plurality of forwarding entries to enable load balancing of network traffic, each of the plurality of forwarding entries including a plurality of variable ranges of internet protocol (IP) addresses, each of the plurality of variable ranges including a first IP address defining a low end of a respective one of the plurality of variable ranges and a second IP address defining a high end of the respective one of the plurality of variable ranges;

receiving, via the network element, the network traffic; and performing the load balancing of the network traffic based on the plurality of variable ranges.

17. The medium of claim 16, wherein the operations include receiving load balancing criteria via a command line interface from a user of the network element.

18. The medium of claim 16, wherein each of the plurality of forwarding entries includes an indication of a port to forward network traffic matching load balancing criteria and a source IP address within a range of source IP addresses.

19. The medium of claim 16, wherein the operations include receiving load balancing criteria, the load criteria defining a portion of the plurality of variable ranges using one or more destination IP addresses, a layer 4 protocol, and a layer 4 destination port.

20. The method of claim 1, further comprising:

increasing a range of source IP addresses of the plurality of variable ranges to increase a load of traffic directed to a particular node.

\* \* \* \* \*